United States Patent
Levit et al.

(10) Patent No.: US 9,073,290 B2
(45) Date of Patent: Jul. 7, 2015

(54) MULTILAYER STRUCTURE USEFUL FOR ELECTRICAL INSULATION

(75) Inventors: Mikhail R. Levit, Glen Allen, VA (US); Byoung Sam Kang, Midlothian, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 624 days.

(21) Appl. No.: 12/825,810

(22) Filed: Jun. 29, 2010

(65) Prior Publication Data
US 2011/0316660 A1 Dec. 29, 2011

(51) Int. Cl.
*B32B 5/16* (2006.01)
*B32B 5/26* (2006.01)
*B32B 23/02* (2006.01)
*B32B 23/10* (2006.01)
*H01B 3/30* (2006.01)
*H01B 3/47* (2006.01)
*H01F 27/32* (2006.01)

(52) U.S. Cl.
CPC ........... *B32B 5/16* (2013.01); *Y10T 428/31779* (2015.04); *B32B 5/26* (2013.01); *B32B 23/02* (2013.01); *B32B 23/10* (2013.01); *H01B 3/305* (2013.01); *H01B 3/47* (2013.01); *H01F 27/323* (2013.01)

(58) Field of Classification Search
CPC .......... B32B 23/02; B32B 23/10; B32B 5/16; B32B 5/26; B32B 23/08; B32B 27/34; H01B 3/305; H01B 3/47; H01F 27/323
See application file for complete search history.

(56) References Cited

U.S. PATENT DOCUMENTS

| | | | | |
|---|---|---|---|---|
| 3,756,908 A | * | 9/1973 | Gross | 162/146 |
| 5,226,970 A | * | 7/1993 | Barnett et al. | 134/14 |
| 6,942,757 B1 | | 9/2005 | Iwama et al. | |
| 6,980,076 B1 | * | 12/2005 | Rolling et al. | 336/207 |
| 2004/0140072 A1 | * | 7/2004 | Kinsley, Jr. | 162/146 |

FOREIGN PATENT DOCUMENTS

| | | |
|---|---|---|
| CH | 634681 A5 | 2/1983 |
| DE | 3000418 A1 | 7/1980 |
| EP | 0722987 A1 | 7/1996 |
| EP | 0739707 A1 | 10/1996 |

* cited by examiner

*Primary Examiner* — Callie Shosho
*Assistant Examiner* — John Freeman
(74) *Attorney, Agent, or Firm* — Andrew G. Golian

(57) ABSTRACT

A multilayer structure particularly useful in a transformer which contains
(a) a first layer of aramid and cellulose wherein
(i) the aramid is present as an meta-aramid in an amount of 0 to 50 weight percent floc and 50 to 100 weight percent fibrid,
(ii) the cellulose is present in the form of cellulosic pulp fiber and
(iii) the aramid is present in an amount of 16 to 75 weight percent and
the cellulose is present in an amount of 25 to 84 weight percent,
said percentages on the basis of the aramid and cellulose and
(b) a second layer containing cellulosic pulp fiber with the proviso that the second layer does not contain aramid.

6 Claims, No Drawings

MULTILAYER STRUCTURE USEFUL FOR ELECTRICAL INSULATION

BACKGROUND OF THE INVENTION

1. Field of the Invention

The present invention relates to a multilayer structure useful for electrical insulation.

2. Description of the Related Art

Kraft paper, made from cellulose pulp, is widely used as a solid electrical insulation in oil filled transformers because of its good insulating properties and economy. However, the cellulose polymer is susceptible to hydrolysis from long term exposure to high temperatures. Thermal stability as well as mechanical strength can be improved by blending high temperature synthetic fibers with the cellulose pulp. A polymer binder is added to facilitate bonding between the synthetic fibers and the cellulose pulp. However, the polymer binder can cause non-uniformity in the paper and sticking problems during paper processing and its usage in contact with transformer coils during high temperature operations.

It is therefore desirable to prepare a paper for electrical insulation with improved thermal stability and mechanical strength while reducing its sticking in processing and the final end-use.

SUMMARY OF THE INVENTION

The present invention is directed to a multilayer structure comprising
(a) a first layer containing aramid and cellulose wherein
(i) the aramid is present as a meta-aramid in an amount of 0 to 50 weight percent floc and 50 to 100 weight percent fibrid,
(ii) the cellulose is present in the form of cellulosic pulp fiber and
(iii) the aramid is present in an amount of 16 to 75 weight percent and
the cellulose is present in an amount of 25 to 84 weight percent,
said percentages on the basis of the aramid and cellulose and
(b) a second layer containing cellulosic pulp fiber with the proviso that the second layer does not contain aramid.

Further embodiments of the present invention include one or more additional layers on a side of the second layer which does not face the first layer, i.e. the additional layer or layers are not intermediate the first and second layers. It is considered that the first layer represents an outer layer in a construction in the event at least three or four layers are present.

Any additional layer or layers may have the construction of the first and second layers. Examples of a four layer construction include the composition of the first and second layers (in any order).

The multilayer construction set forth above is useful an electrical insulation in a device with an electrical conductor. A preferred use is in a transformer.

DETAILED DESCRIPTION OF THE INVENTION

In the present disclosure the term "layer" is employed. However in some instances the layer can be described as a "paper". Generally a paper will have a thickness not greater than 1.0 millimeter. Accordingly in a preferred use each of the disclosed layers will have a thickness not greater than 1.0 millimeter.

A first required layer in the multilayer construction is a layer which comprises
aramid and cellulose wherein
(i) the aramid is present as an meta-aramid in an amount of 0 to 50 weight percent floc and 50 to 100 weight percent fibrid,
(ii) the cellulose is present in the form of cellulosic pulp fiber.

The term "aramid", as used herein, means aromatic polyamide, wherein at least 85% of the amide (—CON H—) linkages are attached directly to two aromatic rings. Optionally, additives can be used with the aramid and may be dispersed throughout the polymer structure. It has been found that up to as much as about 10 percent by weight of other polymeric material can be blended with the aramid. It has also been found that copolymers can be used having as much as 10 percent of other diamines substituted for the diamine of the aramid or as much as 10 percent of other diacid chlorides substituted for the diacid chloride of the aramid. Meta-aramids are those aramids where the amide linkages are in the meta position relative to each other. A preferred meta-aramid is poly(metaphenylene isophthalamide).

The term "floc", as used herein, means fibers that are cut to a short length and which are customarily used in the preparation of wet-laid sheets. Typically, floc has a length of from 3 to 20 millimeters. A preferred length is from 3 to 7 millimeters. Floc is normally produced by cutting continuous fibers into the required lengths using well-known methods in the art.

The term "fibrids", as used herein, means nongranular, fibrous or film-like particles with at least one of their three dimensions being of minor magnitude relative to the largest dimension. These particles can be prepared by precipitation of a solution of polymeric material using a non-solvent under high shear. The fibrids have a largest dimension length in a range from 0.2 mm to 1 mm with a length-to-width aspect ratio of 5:1 to 10:1. The thickness dimension is on the order of a fraction of a micron, for example, 0.1 microns to about 1.0 micron. The fibrids, before being dried, can be used wet and can be deposited as a paper forming component.

In the event a combination of floc and fibrid is employed for the meta-aramid, a preferred weight ratio of floc to fibrid is in a range from 0.5 to 4.0 and more preferably 0.8 to 2.0.

The term "cellulosic pulp", means a fibrous cellulosic material prepared by chemical or mechanical separation of fibers from wood, fiber crops, or waste paper. Cellulosic pulp fiber is a required constituent of the multilayer structure of this invention. Preferred cellulosic pulp is unbleached softwood pulp.

A further requirement is present in the first layer of the multilayer structure namely the aramid is present in an amount of 16 to 75 weight percent and the cellulose is present in an amount of 25 to 84 weight percent, said percentages on the basis of the aramid and cellulose. An example of a more preferred range is 25 to 50 weight percent aramid and 50 to 75 weight percent cellulose.

The required second layer comprises cellulosic pulp fiber with the proviso that the second layer does not contain aramid. The multilayer structure of the present invention is typically formed on conventional paper making machinery. Conventional additives may be used in the formation of the second layer although an additional additive is not necessary. Examples of suitable additives include a polymeric binder such as polyvinyl alcohol, polyvinyl acetate, polyamide resin, epoxy resin, phenolic resin, polyurea, polyurethane, melamine formaldehyde, and polyester.

Improved performance can be obtained if one or more additional layers are employed in combination with the required first and second layers. It is desirable in the additional construction that the first layer be an exterior layer. One other additional layer may have the composition of the first layer (either with the same or different aramid/cellulose ratios) or the second cellulosic layer without aramid can be identical or different from the second layer, The multilayer structure of the present invention can be used as an electrically insulating paper and the structure is particularly suitable in manufacture of a transformer, namely a device that transfers electrical energy from one circuit to another through inductively coupled conductors (the transformers coils). Suitable transformers include large scale including transformers which have the capacity to handle at least 200 kVA and more generally at least 400 kVA. Such large scale transformers typically will contain an oil which is well known. Preferably, when the electrically insulating paper is wrapped around an electrical conducting coil of a transformer, the first aramid containing layer of the insulating paper is located adjacent to the coil. An absence of polymeric binder in the first aramid containing layer is desirable to prevent adhesion and to reduce thermal degradation of the multilayer structure during usage.

Test Methods

The following test methods were used in the Examples provided below.

Basis Weight was measured according to ASTM D 645 and ASTM D 645-M-96 and reported in g/m².

Thickness was measured according to ASTM D 646-96 and reported in mm.

Tensile Strength was measured according to ASTM D 828-93 with 2.54 cm wide test specimens and a gage length of 18 cm and reported in MPa.

Aging Studies were conducted in accordance with ASTM D 2413. A single temperature cell aging system was placed in the conventional lab oven with nitrogen filled head space at 160° C. for 340 to 2,720 hours. The oil impregnation was conducted by thoroughly drying test samples at a temperature of 115±5° C. and an absolute pressure of 75 Pa (0.5 Torr) or less for at least 16 hours, followed by exposure for 8 hours or more at atmospheric pressure in oil for the paper to become completely impregnated in the oil.

Canadian Standard Freeness was measured in accordance with ISO 5267/2 and TAPPI T227 and reported in ml.

Schopper-Riegler Freeness was measured in accordance with ISO 5267/1 and reported in ml.

Multilayer paper structures were prepared using conventional paper making techniques.

Comparative Example A

A two layer paper structure was made from two layers of 100 weight percent cellulosic pulp fiber. Each layer was prepared from an aqueous dispersion of 3 g of cellulosic wood pulp (softwood) from Celco Company (Chile). The pulp was refined to 250 ml of Canadian Standard Freeness. The aqueous dispersion was poured with 8 liters of water into a 21×21 cm handsheet mold and a wet-laid sheet was formed. Two wet-laid sheets of cellulosic pulp fiber were placed together between two pieces of blotting paper, hand couched with a rolling pin and dried in a handsheet dryer at 150° C. for 10 minutes. The dried two layer sheet was calendered at 2800 N/cm linear pressure between a metal roll and a soft roll with metal roll being heated to 80° C. Properties of the resulting two layer paper structure are listed in the Table.

Examples 1-4

Two layer paper structures in accordance with the present invention were made from one aramid containing layer and one aramid free layer. The aramid containing layer was prepared from an aqueous dispersion of a never dried slurry of poly(metaphenylene isophthalamide) fibrids. The meta-aramid fibrids were made in a manner generally described in U.S. Pat. No. 3,756,908 and the fibrids had freeness of 330 ml Schopper-Riegler.

The aramid free layer was prepared with cellulosic wood pulp as described in Comparative Example A.

The aramid to cellulosic pulp fiber ratio was adjusted so that the layers would have 20, 30, 40 and 50 weight percent aramid content. The aqueous dispersions were mixed together for 3 minutes in the British Pulp Evaluation Apparatus and then poured with 8 liters of water into a 21×21 cm handsheet mold, and a wet-laid sheet was formed. The aramid free layer was prepared from an aqueous dispersion of the same cellulosic wood pulp using the same equipment. The aramid containing wet-laid sheet and the aramid free wet-laid sheet were placed together between two pieces of blotting paper, hand couched with a rolling pin and dried in a handsheet dryer at 150° C. The dried two layered sheet was calendered as described in Comparative Example A. Properties of the resulting two layer paper structures are listed in the Table.

Comparative Example B

A two layer paper structure was made from two layers of 100 weight percent aramid content. The layers were made using the aramid containing layer method described in Examples 1-4 except 100% aramid content was used with no cellulosic pulp fiber. Properties of the resulting two layer paper structure are listed in the Table.

Comparative Example C

A single layer paper structure was made illustrating a typical prior art paper structure. The layers were made using the aramid containing layer method described in Examples 1-4 except 70 weight percent cellulosic wood pulp, 20 weight percent Elvanol® 70-62 poly(vinyl alcohol) (available from the DuPont Company) as a polymeric binder, and 10 weight percent aramid floc was used as the aqueous dispersion. The meta-aramid floc was poly(metaphenylene isophthalamide) floc of linear density 0.22 tex and length of 0.64 cm (sold by the DuPont Company under the trade name NOMEX®). Properties of the resulting two layer paper structure are listed in the Table.

Examples 4 and 5 below illustrate the preparation of multilayer structure of this invention in a continuous process using papermaking machinery.

Example 5

A paper with 3-layer structure was formed on multicylinder papermaking machine utilizing 4 forming cylinders.

The slurry, which fed first and fourth cylinders, consisted of water with aramids fibrids and cellulose pulp described in examples 1-4, with 25 weight percent aramid fibrids and 75 weight percent of cellulose pulp in their total content.

The slurry, which fed second and third cylinder, consisted of water and cellulose pulp only.

The solids from the slurries were deposited on the screens of the forming cylinders and from them were transferred on the moving felt.

The wet multilayer paper sheet passed wet press and drying sections, and finally, a machine calender with metal rolls heated to about 80° C.

The produced paper had 3-layer structure with the first layer being aramid-cellulose, the second layer 100% cellulose, and the third layer aramid-cellulose. Basis weight of each layer is 39, 78, and 39 g/m² accordingly. Total basis weight of the paper was 156 g/cm³, thickness 0.130 mm, and apparent density 0.85 g/cm³.

Example 6

A 2-layer structure was formed on the Fourdrinier papermaking machine equipped with primary and secondary headboxes.

The slurry, which fed the primary headbox, consisted of water with cellulose pulp described in examples 1-4.

The slurry, which fed the secondary headbox, consisted of water with cellulose pulp, meta-aramid fibrids and meta-aramid floc. The solid composition of this slurry was:
Cellulose pulp: 50 weight percent;
Meta-aramid fibrids: 30 weight percent;
Meta-aramid floc: 20 weight percent.

Cellulose pulp, meta-aramid fibrids, and meta-aramid floc were the same as in examples 1-4 with the exception that the floc length was 3 mm.

After the wire, a 2-layer sheet passed wet press and dryer section.

The dried sheet was additionally calendered between two metal rolls heated to 180° C.

The final 2-layer paper structure had basis weight of 130 g/m², thickness 0.125 mm, and apparent density 0.85 g/cm³. Its initial tensile strength in machine direction was 82 MPa and in cross direction—43 MPa.

tensile strength retention under accelerated thermal aging as compared to Comparative Example A containing no aramid content and Comparative Example C representing the prior art paper structure containing aramid and a polymeric binder in a single layer construction.

It is considered when the aramid containing layer of the multilayer paper structure of the invention is placed in contact with a transformer coil the paper structure resists thermal degradation and resists sticking problems due to the absence of polymeric binder material in the aramid containing layer.

What is claimed is:

1. A transformer comprising an electrical conductor and an electrically insulating multilayer paper structure material comprising in order
   (a) a first layer containing aramid and cellulose wherein
      (i) the aramid is present as act a meta-aramid in an amount of 0 to 50 weight percent floc and 50 to 100 weight percent fibrid,
      (ii) the cellulose is present in the form of cellulosic pulp fiber and
      (iii) the aramid is present in an amount of 16 to 75 weight percent and
      the cellulose is present in an amount of 25 to 84 weight percent
      said percentages on the basis of the aramid and cellulose and
   (b) a second layer containing cellulosic pulp fiber with the proviso that the second layer does not contain aramid,
   (c) a third layer containing aramid and cellulose wherein
      (i) the aramid is present as a meta-aramid in an amount of 0 to 50 weight percent floc and 50 to 100 weight percent fibrid,
      (ii) the cellulose is present in the form of cellulosic pulp fiber and
      (iii) the aramid is present in an amount of 16 to 75 weight percent and
      the cellulose is present in an amount of 25 to 84 weight percent,
      said percentages on the basis of the aramid and cellulose,
      wherein the paper structure material is wrapped around an electrical conducting coil of the transformer and,

TABLE

MULTILAYER PAPER STRUCTURES AND PROPERTIES

| Example | Total Aramid Content (wt. %) | Cellulose Only Layer Present | Aramid Containing Layer Cellulose (wt. %) | Aramid Containing Layer Aramid (wt. %) | Basis Weight (g/m²) | Thickness (mm) | Tensile Strength (MPa) (% Retention) Unaged | Aged 340 h | Aged 680 h | Aged 1360 h | Aged 2720 h |
|---|---|---|---|---|---|---|---|---|---|---|---|
| A | 0 | yes | na* | na* | 64 | 0.072 | 53 | 25 (47) | 22 (42) | 23 (43) | 19 (36) |
| 1 | 10 | yes | 80 | 20 | 66 | 0.075 | 43 | 27 (63) | 26 (60) | — | 24 (56) |
| 2 | 15 | yes | 70 | 30 | 67 | 0.072 | 38 | — | 29 (76) | 26 (68) | 27 (71) |
| 3 | 20 | yes | 60 | 40 | 68 | 0.081 | 49 | 32 (65) | 30 (61) | 29 (59) | 27 (55) |
| 4 | 25 | yes | 50 | 50 | 71 | 0.082 | 48 | 35 (73) | — | 32 (67) | 28 (58) |
| B** | 100 | no | 0 | 100 | 91 | 0.083 | 46 | 45 (98) | 43 (93) | 48 (104) | 36 (78) |
| C*** | 10 | no | 70% cellulose 20% poly(vinyl alcohol) 10% aramid | | 65 | 0.131 | 39 | 25 (64) | 21 (54) | 18 (46) | 15 (38) |

*na = not applicable
**B is a two layer paper structure with two aramid containing layers and no cellulose only layer.
***C is a single layer paper structure with one aramid containing layer and no cellulose only layer.

The tensile strength data from the Table show that the multilayer paper structure comprising an aramid containing layer of Examples 1-4 of the invention has a higher percent wherein the first layer containing aramid and cellulose contacts the electrically conducting coil and wherein the first layer does not contain polymeric binder.

2. The transformer of claim 1 which is oil filled.

3. The transformer of claim 1 which has a capacity of at least 200 kVA.

4. The transformer of claim 3 which has a capacity of at least 400 kVA.

5. The transformer of claim 1 wherein the first layer and the third layer have the same aramid/cellulose ratio.

6. The transformer of claim 1 wherein the first layer and the third layer have different aramid/cellulose ratios.

* * * * *